US008065714B2

(12) United States Patent  
Budko et al.

(10) Patent No.: US 8,065,714 B2  
(45) Date of Patent: Nov. 22, 2011

(54) METHODS AND SYSTEMS FOR SECURELY MANAGING VIRTUALIZATION PLATFORM

(75) Inventors: Renata Budko, Sunnyvale, CA (US); Eric Ming Chiu, Los Altos, CA (US); Boris Belov, Sunnyvale, CA (US); Boris Strongin, Redwood City, CA (US); Hemma Prafullchandra, Mountain View, CA (US)

(73) Assignee: Hytrust, Inc., Mountain View, CA (US)

( * ) Notice: Subject to any disclaimer, the term of this patent is extended or adjusted under 35 U.S.C. 154(b) by 224 days.

(21) Appl. No.: 12/210,084

(22) Filed: Sep. 12, 2008

(65) Prior Publication Data

US 2010/0071035 A1  Mar. 18, 2010

(51) Int. Cl.
*G06F 7/04* (2006.01)
*G06F 15/16* (2006.01)

(52) U.S. Cl. ................................. 726/4; 726/2; 713/186

(58) Field of Classification Search ................... 726/4, 2
See application file for complete search history.

(56) References Cited

U.S. PATENT DOCUMENTS

| | | | | |
|---|---|---|---|---|
| 5,944,824 | A * | 8/1999 | He | 726/6 |
| 6,178,511 | B1 * | 1/2001 | Cohen et al. | 726/6 |
| 2002/0169987 | A1 | 11/2002 | Meushaw et al. | |
| 2005/0210467 | A1 | 9/2005 | Zimmer et al. | |
| 2006/0026688 | A1 | 2/2006 | Shah | |
| 2007/0022138 | A1 * | 1/2007 | Erasani et al. | 707/104.1 |
| 2007/0022480 | A1 | 1/2007 | Charles | |
| 2007/0067351 | A1 | 3/2007 | Singh et al. | |
| 2007/0073858 | A1 | 3/2007 | Narayanan et al. | |
| 2007/0118350 | A1 | 5/2007 | Van Der Made | |
| 2007/0180493 | A1 * | 8/2007 | Croft et al. | 726/2 |
| 2007/0261121 | A1 | 11/2007 | Jacobson | |
| 2008/0034408 | A1 | 2/2008 | Duggal | |
| 2008/0098309 | A1 | 4/2008 | Fries et al. | |
| 2008/0256538 | A1 | 10/2008 | Carter et al. | |
| 2009/0061146 | A1 | 5/2009 | Jeong | |

FOREIGN PATENT DOCUMENTS

KR  10-2007-0112755 A  11/2007

(Continued)

OTHER PUBLICATIONS

Hytrust, Inc. et al., PCT/US2009/051995 filed Jul. 28, 2009; International Search Report and Written Opinion; ISA/KR; Feb. 24, 2010; 9pp.

(Continued)

*Primary Examiner* — Kim Vu  
*Assistant Examiner* — Yogesh Paliwal  
(74) *Attorney, Agent, or Firm* — SNR Denton US LLP

(57) ABSTRACT

Virtualization platforms and management clients therefor are communicatively coupled to one another via a control layer logically disposed therebetween. The control layer is configured to proxy virtualization management commands from the management clients to the virtualization platforms, but only after successful authentication of users (which may include automated agents and processes) issuing those commands and privileges of those users as defined by access control information accessible to the control layer. The control layer may be instantiated as an application running on a physical appliance logically interposed between the virtualization platforms and management clients, or a software package running on dedicated hardware logically interposed between the virtualization platforms and management clients, or as an application encapsulated in a virtual machine running on a compatible virtualization platform logically interposed between the virtualization platforms and management clients.

31 Claims, 3 Drawing Sheets

FOREIGN PATENT DOCUMENTS

WO  WO 2005114439 A1 * 12/2005

OTHER PUBLICATIONS

Hytrust, Inc. et al., PCT/US2009/051590 filed Jul. 23, 2009; International Search Report; ISA/KR; Feb. 23, 2010; 8pp.

Hytrust, Inc. et al., PCT/US2009/051883 filed Jul. 27, 2009; International Search Report and Written Opinion; ISA/KR; Feb. 2, 2010; 9pp.

Charu Chaubal, VMware Infrastructure 3, Security Hardening, 2007, 19 pp. Palo Alto, USA.

Michael Hilker, Next Challenges in Bringing Artificial Immune Systems to Production in Network Security, Bionetics 2007 Dec. 10-12, 2001, Budapest, Hungary, 7 pp.

VMware ESX Server 3.x Benchmark—Version 1.0, The Center for Internet Security, Oct. 2007, 70pp.

VMware, VMware Esx Server 3-Best Practices for VMWare ESX Server 3, VMware White Paper, Copyright 1998-2006, 13pp, Palo Alto, USA.

National Security Agency, VMware ESX Server 3 Configuration Guide, Enterprise Applications Division of the Systems and Network Analysis Center (SNAC)—Information Assurance Directorate, Mar. 3, 2008, 26 pp, Ft. Meade, USA.

Intel Technology Journal, Autonomic Computing, vol. 10, Issue 04, Published Nov. 9, 2006, 84 pp.

* cited by examiner

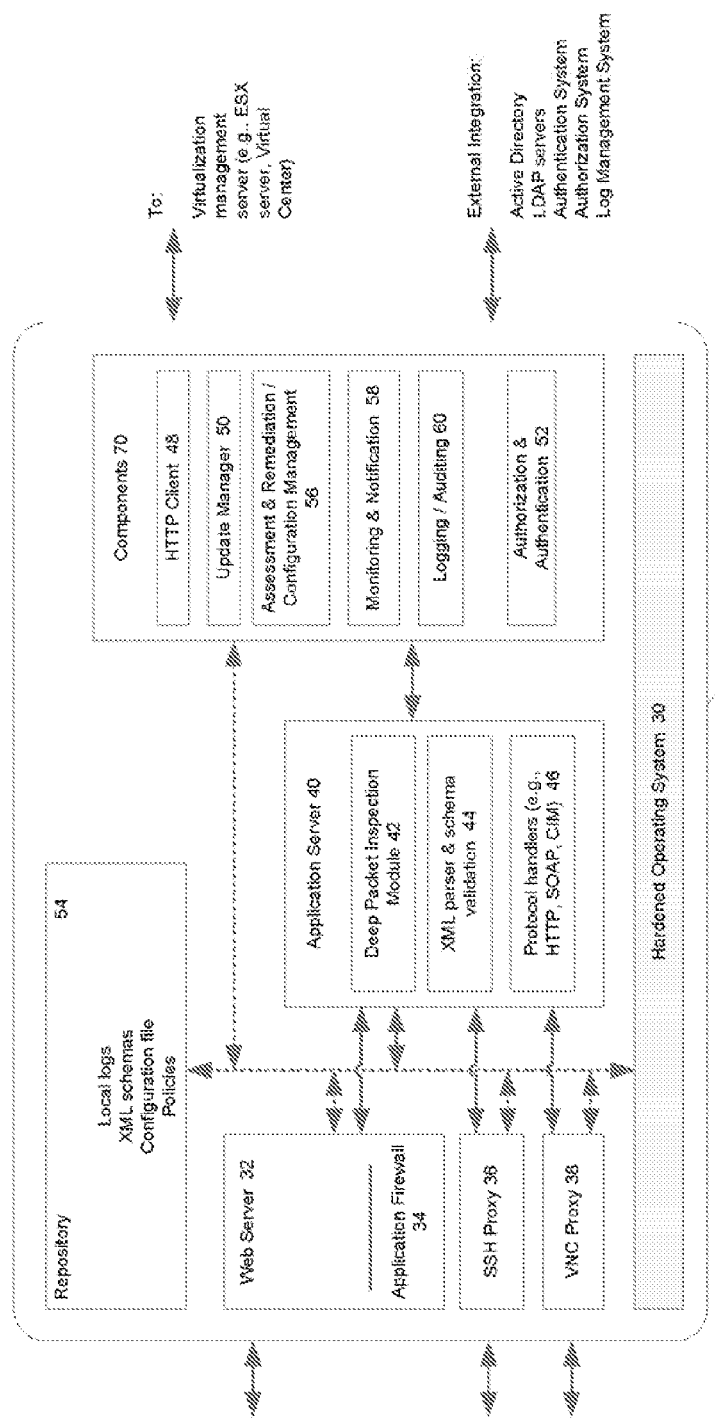
Figure 3
Figure 4

METHODS AND SYSTEMS FOR SECURELY MANAGING VIRTUALIZATION PLATFORM

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

COMPUTER PROGRAM LISTING

Incorporated herein by reference is a Computer Program Listing Appendix A setting forth aspects of an embodiment of the present invention in computer source code file entitled "SSH_DAEMON_ASSESSMENT_SCRIPT".

FIELD OF THE INVENTION

The present invention relates to methods and systems for securely managing virtualization platforms.

BACKGROUND

Virtualization is a term that has been coined to refer to the abstraction of computer resources. This includes abstraction of both hardware and software at multiple levels, from individual servers and clients to complete networks. In this latter instance, the term "virtual infrastructure" has been used to refer to abstracted resources of a computer network, inclusive of all the hardware and software.

To understand some of the benefits that have been realized through the use of virtualization consider that in traditional, non-virtualized environments, data centers typically follow the "one server-one application" rule. This results in a large number of servers, each requiring its own storage resources, power supply, and physical cabinetry or other space. Because resources cannot be added to these systems easily or quickly, they are often over-provisioned to handle "worst case" or peak load scenarios. As a result, much of the actual capacity of the data center is under-utilized most of the time.

In contrast, server virtualization abstracts the resources of physical computer machines to create larger pools of processor and memory resources that can be allocated dynamically to applications or processes, as they are needed. Virtualization partitions an individual physical server into several "virtual machines" each of which can run its own "guest" operating system and application environment. This lets organizations consolidate workloads and run multiple applications on the resources of shared servers, so existing hardware can be better and more fully utilized. Similarly, visualization techniques can be applied to other resources, such as networks and storage. Virtualization also allows the packaging of complete operating system and applications as a portable virtual environment (also referred to as encapsulation), that can be moved from one virtual machine location to another, for example, if a server fails or resources becomes unavailable.

With the benefits of virtualization, however, come several serious security risks. Because virtual infrastructures can now be managed remotely through software, controls that existed in the pre-virtualization world are now relaxed or bypassed altogether. Users with access to software management facilities now can create copies of disks with sensitive data, cause denial of service to an important application by starving it of resources or accidentally connecting a critical virtual machine to an insecure network. More malicious attacks may take the form of "hyperjacking" in which hypervisors (software layers that abstract physical hardware resources from the virtual machines running thereon) are compromised, leading to the attacker gaining unfettered access to all of the virtual machines running on a server. These and other risks demand that virtualized resources be placed under the control of stringent security facilities.

SUMMARY OF THE INVENTION

The present invention provides methods and systems for managing virtualization platforms. In one embodiment of the invention, a plurality of virtualization platforms and one or more management clients for the virtualization platforms, are communicatively coupled to one another via a control layer logically disposed therebetween. The control layer is configured to proxy virtualization management commands from the one or more management clients to the virtualization platforms, but only after successful authentication of users (which may include automated processes or agents) issuing those commands and privileges of those users as defined by access control information accessible to the control layer. The control layer may be instantiated as an application running on a physical appliance logically interposed between the virtualization platforms and management clients, or a software package running on a compatible dedicated hardware logically interposed between the virtualization platforms and management clients, or as an application encapsulated in a virtual machine running on a compatible virtualization platform logically interposed between the virtualization platforms and management clients.

In various embodiments of the invention, the control layer operates at the application layer to scrutinize management access and operation attempts made via the one or more management clients. Indeed, the control layer is preferably configured to inspect each attempted access to perform management operations by the management clients to determine whether or not an asserted command/operation is one that is valid schematically and authorized for a respective one of the users issuing the asserted command. That asserted command is dropped if it is not valid and/or not authorized and a network administrator or other designated recipient or agent may be notified of a failed attempt to access the virtualization platforms.

In accordance with embodiments of the invention, authentication mechanisms for the users may include some or all of: user name/passwords, two-factor authentications, authentications involving digital certificates, authentications involving presentment of a biometric indicator, and authentications of automated agents or processes using a hardware trusted platform module. The access control information may include restrictions based on time of day, target virtualization platform or virtualized resource, attempted management operation/command, and/or location of management client. Notably, upon successful authentication of a subject one of the users, the control layer is configured to negotiate one or more log-in sessions with one or more of the virtualization platforms on behalf of the subject user. For example, the control layer may log-in the subject user at the root level or other appropriate level of the virtualization platforms.

In some instances, the control, layer is configured to provide desired device configurations to one or more of the virtualization platforms from a single instance of a configuration file or template. The control layer may also monitor configuration decisions and activities of the virtualization platforms and, in the event of an alarm condition, alert an administrator or agent to a potential problem. The control layer also logs attempts to access the virtualization platforms, whether they be successful or not, and these logs may be stored by an appliance at which the control layer is instantiated prior to being transferred to a remote system in order to prevent any loss of data due to network unavailability.

These and other features of the present invention are described in greater detail below.

BRIEF DESCRIPTION OF THE DRAWINGS

The present invention is illustrated by way of example, and not limitation, in the figures of the accompanying drawings in which:

FIG. 3 illustrates an example of a security appliance configured to proxy management access to virtualization platforms in accordance with an embodiment of the present invention; and FIG. 4 illustrates an example of a virtualized architecture for the security appliance shown in FIG. 3 when running on a hypervisor.

DETAILED DESCRIPTION

Figure 1:
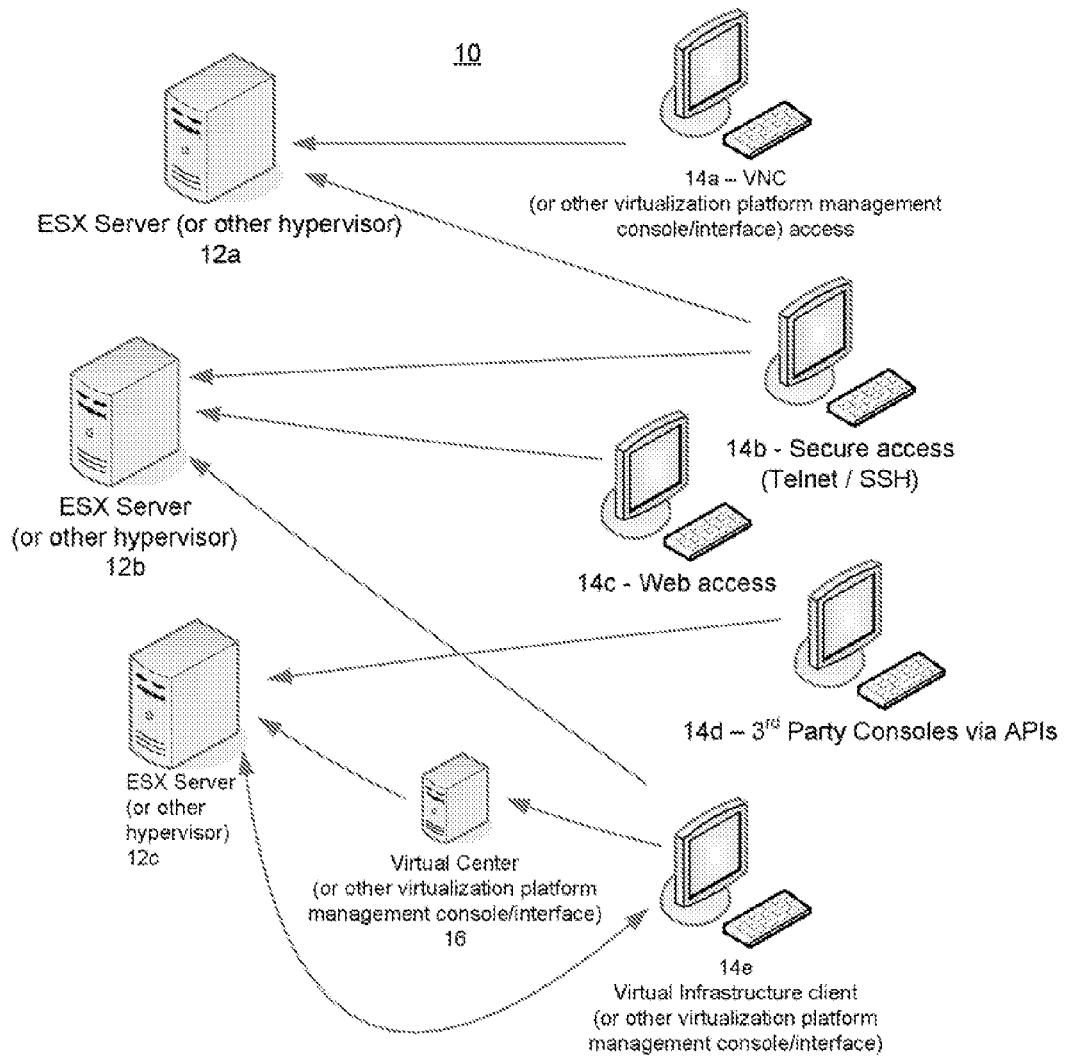
FIG. 1 illustrates an example of a virtualized environment in which multiple different channels for management access to virtualization platforms are available.

Described herein are methods and systems for securely managing virtualization platforms.

From the above, it should be apparent that as more and more business-critical applications are deployed on virtual servers and infrastructures, securing those applications and the associated sensitive and valuable data becomes a significant concern. Not only does the virtual environment need to be protected against security threats that also threaten traditional, physical infrastructures, the virtual environment presents new, unique security challenges that did not previously exist. Thus, the need for new forms of security management has arisen.

With traditional, physical infrastructures, administrators typically looked to secure potential vulnerabilities of physical components, checked for specific types of file activity or download, and monitored systems for other unusual behavior or unauthorized access. In most cases, the same or similar methods and tools will work for the virtual environment. For example, if one uses antivirus programs or intrusion detection or prevention systems (IDS, IPS) to detect or prevent problems on a system where an enterprise application runs, those same programs should be installed if the application runs in a virtual machine. Likewise, if a local area network (LAN) segment between two physical servers requires a firewall, then once the servers are virtualized the virtual servers should also be protected by a firewall on the virtual network.

Beyond these more traditional security measures, however, the virtualization environments demand additional considerations. For example, physical access to computer resources is no longer needed to make significant changes in the overall computing environment—the deployment of new servers, cloning of drives, and booting machines from alternative locations all previously required physical access to a data center with authorization tightly enforced by security measures such as card keys or physical rack keys, but the same operations can now be performed via virtual infrastructure clients running on computers that are located outside of the data center. As a result, virtual "hardware" components of the virtual machines may be at risk and less secure than hardware of physical application servers. Likewise, sensitive data, once accessible only locally, is now being hosted within virtual machines that are themselves easily portable. Further, because of the flexibility afforded by virtualization technology, additional opportunities for potential intrusion and access have been exposed.

The present inventors have recognized the need for improved security means that accommodate this new paradigm of application management driven by encapsulation, portability and flexibility so that the tremendous benefits afforded by virtualization technology do not lead to reduced security within an enterprise. To provide for this need, the present invention introduces a control layer through which all attempts to access the virtualized resources from a management or administrative standpoint must pass. This control layer (which in one embodiment is instantiated as an application running on a physical appliance logically disposed between the virtualization platforms and management clients seeking access thereto) operates at the application layer to scrutinize management access attempts and authenticate users attempting such access. All management commands are proxied by the control layer so that the virtualization platforms and the management clients communicate only with the control layer and not directly with one another. In this way, the present security architecture provides an integration point between the virtual infrastructure and existing physical systems, and puts controls in place to restrict access, enable comprehensive forensics and enforce consistent configuration practices within an enterprise.

To illustrate the operation of the present control layer within a virtual environment, it is helpful to first understand how virtualization commands are executed. For purposes of example, a VMware virtual environment will be described, however, the present methods and systems are applicable to any virtual environment. FIG. 1 illustrates a virtual environment 10 and shows a generalized situation in which several VMware ESX servers 12*a*-12*c* are deployed and accessed in different ways from management clients 14*a*-14*e*. An ESX server is a construct on which multiple different applications and operating systems may run. Essentially, the ESX server abstracts the physical hardware of the server machine from the operating system(s) and the application(s) running thereon, and each application and operating system becomes a virtual machine within that environment. Of course, the present invention is applicable not only to environments using ESX servers, but also to those employing any other hypervisor in place of or in addition to ESX servers.

In the illustration, different forms of access to the ESX servers are shown for various management clients 14*a*-14*e*. This is solely for illustration purposes and, in general, a single management client may access an ESX server in multiple different ways. That is, to create, start or stop a virtual machine, or to execute another virtualization command, a management client must connect to an ESX server 12*a*-12*c* using one of two available user interface clients or one of five available programmatic interfaces (which may also be used for scripting or access by third-party applications). Alternatively, equivalent commands may be executed on a local service console or by remotely connecting to the console using a remote communication protocol (such as TELNET or secure shell (SSH)). Virtual network computer (VNC) access, which is frequently used to gain access to the boot environment of individual virtual machines, and a VirtualCenter 16, a particular form of VMware management software typically deployed on a resource separate from those hosting the ESX servers, further complicate the deployment environment.

The arrangement shown in FIG. 1 highlights the security problems posed by the virtual environment. Management commands may be received via a multitude of channels. This means that multiple ports on each ESX server are potential entry points for malicious activities. Further, in the case of a VMware environment, users that gain access through any of these entry points (e.g., by successfully navigating a user name/password challenge) are typically logged in at a root level, meaning that the user will have access to all facilities of the subject ESX server. Finally, because of the distributed nature of the environment, and the increasing adoption of virtualization technology, administrators are forced to manually configure multiple instances. While such a task may not be difficult when only a small number of servers are involved, when that number grows to several dozen or more, the administration task becomes quite daunting.

Figure 2:
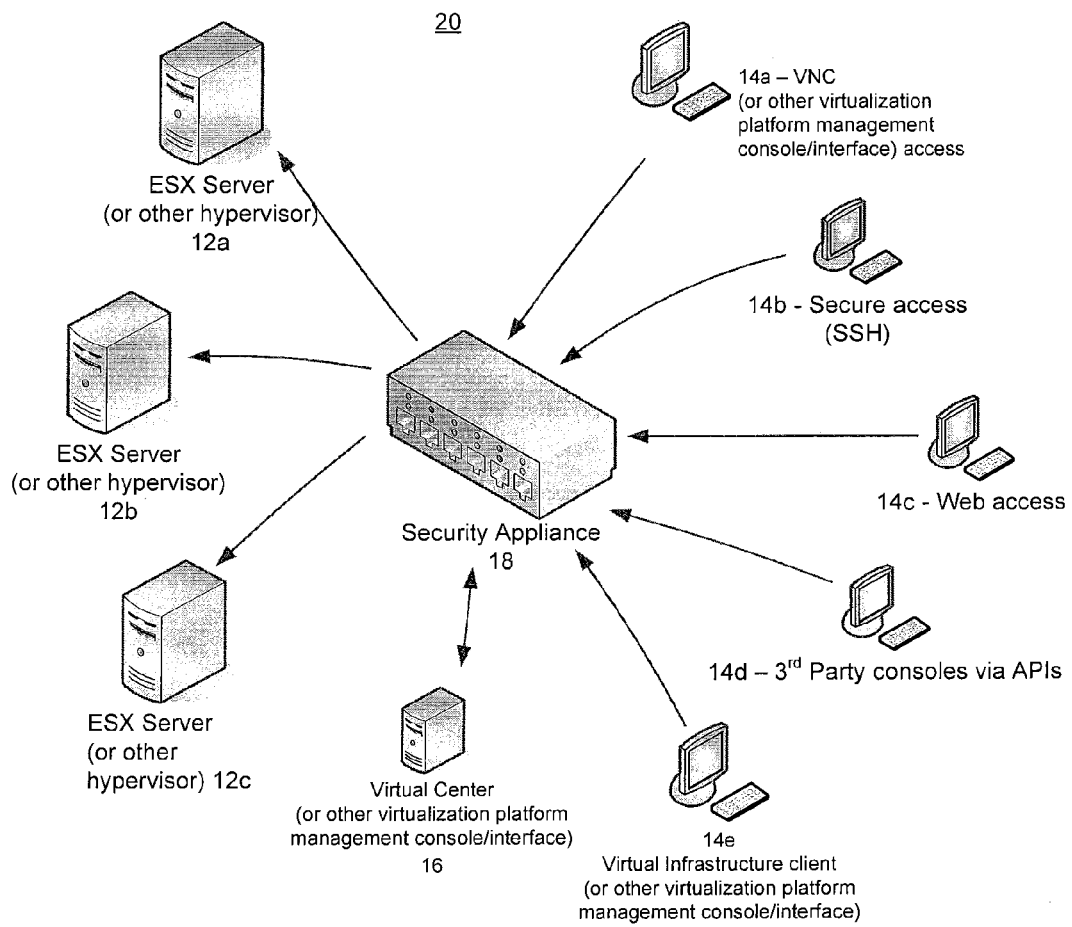
FIG. 2 illustrates an example of a virtualized environment in which management access to virtualization platforms are proxies through a control plane or layer logically disposed between management clients and target virtualization platforms in accordance with an embodiment of the present invention.

In contrast to the above, the present invention introduces consistency and control through the introduction of a virtual infrastructure control plane. As shown in FIG. 2, this may be instantiated by the introduction of a security appliance 18 within a virtualization environment 20. With such a virtual infrastructure control plane in place, administrators (or anyone else seeking management access) can only connect to the virtual infrastructure via security appliance 18, which acts as a proxy—that is, appliance 18 acts on behalf of the ESX servers 12*a*-12*c* when communicating with the management clients 14*a*-14*e* and the VirtualCenter 16 and on behalf of those clients and the VirtualCenter when communicating with the servers. The proxy is configured to communicate via all the different "languages" or protocols of the virtual environment 20 and each interaction is interpreted in terms of valid virtual infrastructure commands and authorized based on the user's identity and the target resource being modified.

The present invention thus introduces a control layer that acts as an inline proxy for management/administration operations performed on the virtualization platforms (e.g., ESX servers). Regardless of whether this proxy is instantiated as a hardware or software solution (and in one embodiment it is instantiated within a virtual machine on a virtualization server hosted on the appliance 18), controls are enforced at the application level, meaning that all commands performed on the virtualization platforms are monitored and allowed (or not) based on policies set by administrators. That is, each attempted access from a management client is inspected to determine whether or not the asserted command is valid, and is one that is authorized for the associated user (that user having been previously authenticated). If the command is not valid, it is not passed on to the virtualization platforms and network administrators may be notified of the situation.

In one particular implementation, a user may be allowed a predetermined number of authentication attempts before being locked out from further attempted accesses. The number of permitted attempts may be specified as part of a security policy. For properly authenticated users, each management command is inspected for validity—that is, the schema and parameters of the attempted command are checked to see if the command is a valid one for the user and the target resource. The proxy conducts this analysis at the transport layer (e.g., HTTP/SOAP, RPC, socket, etc.) and the application layer (e.g., WS, R-CLI, WMI etc.). If an illegal command or parameter is detected, this is interpreted as a potential attack on the target resource and so the command is dropped and a failure message sent to the associated management client. If the command and its parameters are valid, a check is made to determine whether the authenticated user is actually allowed to perform said command. If the user is so authorized, then the request/operation is sent to the target resource (e.g., an ESX server), if not, then appropriate personnel are notified of the attempt and an appropriate response is sent to the management client.

In addition to enforcing polices, the control layer introduced between the virtualization platforms and the management clients allows for single point authentication and authorization of all users (and herein an automated agent or process, i.e., a program or routine, is considered a form of user) seeking to access and perform operations on the virtualization platforms. As indicated above, without such a control layer each user that successfully responds to a user name/password challenge is typically granted root access to a virtualization platform and, consequently, all virtualized objects, meaning that the user has complete access to all facilities of that physical server. With the authentication provided by the new control layer, however, every user is identified and validated as a known entity and the authentication mechanisms applied can be evolved to meet the needs of the enterprise. For example, authentication mechanisms can take the form of user name/passwords, two-factor authentications (e.g., involving the use of a token separate from a password), authentications involving digital certificates, or even authentications involving the presentment of a biometric indicator (in the case of human users), or the use of a hardware trusted platform module (TPM) to authenticate automated agents/processes.

By separating the authentication process and function from the virtualization technologies, the level of authentication implemented can be enforced consistently through a single management node, and yet be highly available. The authentication and authorization service implemented as part of the proposed control layer supports role-based access control, meaning each user, once successfully authenticated, is granted a set of privileges that allows that user to perform the various virtualization management commands appropriate to the user's role. In the VMware case, this may include commands such as creating a new virtual machine, starting and stopping an existing virtual machine, and so on. In addition to defining user/role-based access restrictions, access polices may allow for restrictions based on time of day, target resource (e.g., a particular virtualized server or virtual machine), and/or other criteria.

In one embodiment, the centralized access control provided by the control layer is facilitated through the use of Microsoft™ Active Directory™. Active Directory directory service provides well-known means to manage user identities within network environments. Briefly, an Active Directory structure is a hierarchical framework of objects that fall into three broad categories: users, resources and services. The Active Directory in which these objects are managed provides information on the objects, organizes them, controls access and sets security policies.

Centralized access control integrated with Active Directory and authorization for all configuration and management operations carried out in a virtualized environment from any management client and using any protocol provides flexibility of virtualization management with security that matches or exceeds the security and access standards of physical hardware. It also permits "single sign on" so that once a user has been authenticated at the control plane no further log-ins are required to access the individual virtualization platforms.

Note that in practice, for a VMware implementation, once a user has been authenticated at the control plane, the control plane may handle individual log-in sessions with the virtualization platforms on behalf of the user and in doing so may log-in the user at the root level of that server as that is the default access group supported by the VMware technology for system administrators. However, because all user operations are proxied through the control layer, any role-based restrictions designed by the network administrators are enforced at that layer and only valid, authorized commands will be passed to the virtualization platform, despite any root-level access mapping necessary.

The introduction of the present control plane or layer also provides for important configuration management, monitoring and notification services. As indicated above, while manually managing a few virtualization servers may be possible, system administrators quickly become overwhelmed when having to cope with tile configuration and monitoring of dozens of virtualized servers and virtual machines. By introducing a common control plane over all of these resources, administrators are able to push desired device configurations to the target resources from a single instance of a configuration file or template. This ability to control configuration of virtualization servers (e.g., VMware ESX servers) and/or virtual machines (or other aspects of a virtual infrastructure) to enforce configuration decisions, operating system hardening, and desired security practices based on administrator-definable or pre-configured policy templates eliminates manual configuration tasks, enforces consistency and ensures security enforcement that withstands moves, additions, changes, patches, upgrades and migrations.

Another important benefit provided by the present control plane is the ability to conduct centralized monitoring of configuration decisions and activities of the virtualization platforms. The present invention affords detailed visibility of the virtualized environment through monitoring that does not impact the performance of the virtualized environment and yet is rich enough to satisfy compliance requirements and provide instant notification when the environment is not behaving within set compliance parameters. In the event of an alarm condition, the control plane is configured to automatically and immediately alert the necessary personnel through any of a variety of notification channels (e.g., email, phone, instant messaging, etc.), enabling quick response and remediation. These channels may be arranged in a hierarchy according to the severity of the alarm condition (i.e., different notifications may be used according to the severity or urgency of the alarm condition).

The monitoring function is also enhanced by the use of centralized, human readable logs that capture records of all changes made to a virtualized environment and the specific users who made them. This provides visibility into the manner in which the virtualized environment is being manipulated, enables data standardization, eliminates manual collection of log data, and satisfies various regulatory compliance requirements and forensic needs. The logs may be stored locally (at least for a designated period of time) and/or off-loaded to an aggregator/archive system. For example, the security appliance may be configured to store 60 minutes worth of log data and then off-load that data to a log repository where other analysis tools may be used in the event the logs require review. Prior to such off-loading, the logs may be digitally signed, to provide data integrity and authenticity. The ability to store logs locally also enables reliable transfer/off-loading of the logs, when network connectivity is intermittent.

Referring now to FIG. 3, a more detailed view of the security appliance 18 is shown. As indicated in FIG. 4, the security appliance 18 may in fact be instantiated as a virtual machine 22, which is abstracted from a hardware layer 24 of a server 26 by a hypervisor 28 (e.g., an ESX server). Of course, in other instantiations the security appliance may be an application program executing in a non-virtualized environment.

As illustrated, the foundation of security appliance 18 is a hardened operating system 30. In one implementation this may be a Linux operating system. As used in this context, "hardened" means an operating system that has been safeguarded against intrusion. Operating systems typically arrive from the vendor with a multitude of development tools and utilities, which, although beneficial, also provide potential back-door access to an unauthorized user. Hardening of an operating system typically involves the removal of all non-essential tools, utilities and other system administration options, any of which could be used to exploit unauthorized access to the operating system or the underlying machine on which it is installed. The hardening process may also involve activating certain security features and restricting access to the root administrator account.

The role of security appliance 18 is that of a central security authority that determines who is allowed to do what on, or in connection with, which resource and when. Policies established by network administrators are consulted when making these decisions. For example, a user accessing an ESX server via a VI client (VIC) over a local, virtualized LAN may be entitled to greater privileges than a user connecting over a remote web client. Or, a user attempting access, by any means, during business hours may have fewer privileges than the same user outside of business hours, in order to minimize network disruptions at times when the expected application load is expected to be high.

To perform these functions, security appliance 18 operates as an in-line proxy between one or more management clients and one or more virtualization platforms. Hence, the security appliance 18 includes a variety of facilities to connect with the management clients, such as a web server 32 that may include a firewall 34. The web server 32 is available to communicate with management clients connecting via Web-based management clients, for example using HTTP, HTTPS, and other Web-based communication protocols. Likewise, an SSH proxy 36 and VNC proxy 38 are provided to facilitate communications with management clients over SSH and VNC channels. Other inbound communication proxies may be provided to accommodate other forms of management clients.

Inbound communications received over these channels are passed to an application server 40. The application server includes a deep packet inspection module 42 that is configured to inspect the commands received from the management clients and ensure that valid data (e.g., requests and parameters) are being passed. Commands containing invalid data are rejected and are not passed on to the virtualization platform. In response to valid commands from a management client, the application server 40, after checking to ensure the user is authorized to perform the subject command, will issue a corresponding command with the valid data to the target of that command (e.g., the resource—the virtualization platform or any of the virtualized objects managed by it—which is the subject of the command from the management client) via a secure channel. This channel may be an HTTP/S channel that makes use of the HTTP client 48 or an SSH channel.

The application server 40 also includes an extensible markup language (XML) parser and schema validation module 44 and various protocol handlers 46. The protocol handlers are adapted to allow for receipt of the various communication protocols used by the different management clients for the virtual environment. Hence, for example, HTTP, VIC (SOAP), CIM, VNC, SSH, Powershell, and other protocol handlers may be provided. The XML parser and schema validation module 44 is configured to allow for parsing of management commands that are passed in XML format to ensure that these commands are in a valid format for the target resource. Invalid commands are rejected and only valid commands are proxied to the target of the command. In accordance with the present invention, the virtualization platforms are configured to only allow management traffic from the security appliance 18, thus disabling all of the management client interfaces from communicating directly with them. For example, VMware ESX servers are configured to only allow management communication through the security appliance 18. This reduces the number of possible attack vectors.

The security appliance 18 includes a number of additional modules. For example, an update manager 50 is included to facilitate the uploading of valid software updates for the security appliance, as shown in components 70. The security appliance 18 may be configured to periodically check for such updates, for example by polling a known update server to see if any updates that have not been previously installed are available. Preferably, a "push" model where software updates are provided to the security appliance 18 from one or more update servers without any specific request for same from the security appliance is not employed inasmuch as this could be a potential path for unauthorized users to gain control of the security appliance.

An authorization and authentication module 52 is also provided. In one embodiment these functions may be offered in a single module. In another embodiment, the functions may be offered as two separate modules. By centralizing the authentication and authorization function for an entire virtualized environment, the present security appliance facilitates identification of the individual that is attempting access to the virtualization platforms and enforces a level of authentication better than that required by most virtualization technologies deployed today. For example, in large enterprises, system administrators are often required to use 2-factor authentication and are issued an authentication token for such purposes. Currently, many of the virtualization servers/platforms do not provide out-of-the-box integration to external authentication systems. With the use of security appliance 18, however, there is no need to build and deploy this capability for every virtualization server within the enterprise. Instead, this facility can be enabled once in the security appliance, which effectively enables all the virtualization servers that it supports.

Authorization provides fine-grained access controls to allow different individuals or groups of individuals to perform management changes/operations on specific targets, such as virtualization servers/platforms or actual virtualized objects. The following table exemplifies how the access control privileges may be represented. The enumerated parameters are meant to be representative and not exhaustive, as the set of qualifiers that may influence the granting of access is extensible.

Further details regarding authentication and authorization within the present security appliance are best described using an object oriented approach. With this approach, system functionality is described in term of objects used to implement the system. One benefit of this approach is that it will naturally produce a set of defined terms to describe the authentication and authorization scheme. Again, the VMware environment will be used as an example, but the present method and systems are applicable to any virtualized environment.

User Authentication: When a user attempts to establish a session with an ESX server or a VirtualCenter (or, more generally, a target resource), the request is intercepted by security appliance. The appliance will use the credentials supplied by the user or the programmatic API (these could be login/password or Kerberos token, for example) to authenticate the user against a combination of the data stored in a local LDAP directory and/or a central user directory/Active Directory (AD) or an external authentication system. In addition, the security appliance will perform an authorization check to determine if the user is allowed to log into the target resource and perform the operation. Once the user is successfully authenticated, information such as the user ID, list of AD groups the user belongs to, and target ESX server are available to the authorization and authentication module 52, which may be configured to perform command by command authorization. If the security appliance can not authenticate the user, the authentication fails and this user will be refused access to the virtualization platform. Assuming the user is successfully authenticated, the security appliance maps the authenticated user to either a special "super user" account, or, if configured, the original user credentials.

User operation requests: For each request, the security appliance receives the requested operation and the target resource for that operation. In response, the security appliance retrieves, from a local repository 54 or a remote policy server or directory (such as AD), the applicable policy for the target resource and determines whether the requested operation is one permitted by that policy. If the policy allows the subject user to perform the subject operation on the target resource (termed a "privilege" of the user), the security appliance proxies the management request to its intended destination. Otherwise the security appliance declines the request.

As alluded to above, a privilege is the right of a user to perform an operation or a set of operations. The repository 54 (which in various embodiments may be a local database, a remote database or directory, or even a set of remote systems that provide specific services, such as a policy server) may store a set of predefined privileges for supporting different roles. Some of these predefined privileges may be applied to all types of resources, but others may be suitable only for certain specific types of virtualized objects. With this in mind, when a request is received at the security appliance, the target

TABLE 1

Example of access control table

| User | Role | Client (IP Addr.) WHO | Client (Type) | Access Protocol | Target Resource WHAT | Operation Allowed (Management Request) | When WHEN |
|---|---|---|---|---|---|---|---|
| User 1 | SysAd1 | Internal | VIC | HTTP/SOAP | ESX Server A | VM Start VM Stop | 0900-1700 |
| User 2 | SysAd4 | Anywhere | All | Any | All | All | Any time | resource of the request, the identity of the user, and requested operation are identified. In one embodiment of the invention, using the target resource as an index, the appropriate policy is retrieved and the subject user's privileges (identified by the role played by the user) are examined. We denote this set of privileges by $P_{owned}$. Using the operation of the request, the privileges needed to perform the operation are identified (e.g., by retrieving same from, for example, the VirtualCenter, an external system or repository 54) and denoted as $P_{needed}$. If $P_{needed}$ is included in $P_{owned}$, the operation is authorized, otherwise it is declined. If the operation is authorized, the request is proxied to the target resource.

Security appliance 18 also includes an assessment and remediation/configuration management module 56. Security of the virtualization server is of paramount importance because if a virtualization platform is compromised then all associated virtualized objects (networks, machines, storage, etc.) are vulnerable. The configuration of the physical system and the virtualization platform is critical to enabling a good security posture. The assessment and remediation/configuration management module 56 is enabled to automatically discover the existing configuration of virtualization platform (e.g., operating systems, virtualization servers, etc.) in the virtualized environment.

Once the existing configuration is understood, it may be assessed against a number of benchmarks/guidelines. These benchmark configurations may be stored in repository 54 and accessed as needed. The results (pass, fail) of the assessment are presented and a system administrator is provided the opportunity to repair any failed configuration settings. Such remediation measures (e.g., replacing improper or outdated virtualization platform configurations with proper or updated ones as described by the benchmarks) can be automatically applied or can be applied manually.

All virtualization servers (and other virtualized objects) may then be regularly monitored for variance from "approved" configurations. The configurations may be 1:1 maps (meaning one specific configuration for each server) or 1:Many maps (meaning a specific configuration is applied to a set of virtualization servers). In one embodiment, these "approved" configurations are stored in a machine readable/actionable configuration "dialect" based on XML. The assessment and remediation of the virtualization servers may be achieved through a combination of programmatic scripts executed directly on the virtualization servers and through network programmatic interfaces. Appendix A includes an example of a Perl script for checking the configuration settings of an SSH daemon (an aspect of an Operating System) against a deemed "best practices" template for such a daemon and repairing the variance.

The security appliance 18 also includes a monitoring and notification module 58 and a logging/auditing module 60. By enabling audit-quality logging, monitoring and notification in the security appliance, several security and compliance burdens are lessened. For example, system administrators no longer have to pull logs from individual virtualization servers and filter those logs for management operations to understand what has happened. This is a reactive response. With the ongoing monitoring and notification facilities provided by security appliance 18, the response can become proactive in certain situations. The security appliance 18 can also enforce certain security policies rather than simply notify of breaches.

The logging/auditing module 60 provides human-readable, audit-quality logs, which may be passed on to external log management systems and stream/transfer logs as needed by those systems. In addition, the module is capable of permitting searching and display of logs stored locally. Logs may be so stored locally (at least for a time) in repository 54 to provide some level of redundancy and to support the reliable transfer of the logs from the security appliance to an external log management/archive system. Preferably, log records are integrity protected and digitally time stamped. This allows the detection of any tampering and preserves the time an event took place along with an identification of the user that caused the event. The time source for the logs may be local at the appliance and may be synchronized with an external, reliable time source.

In one embodiment of the invention, each log record includes information concerning the identification of the appliance component generating the log, a time stamp (e.g., formatted in accord with a preferred format such as the ISO8601 format of YYYY-MM-DD Thh:mm:ssTZD, where YYYY is a 4-digit year (e.g. 2008), MM is a 2-digit month (e.g. 09), DD is a 2-digit day (e.g., 05), and T indicates the beginning of a time field in which hh is a 2-digit hour (e.g., 15), mm is a 2-digit minute (e.g. 27), and ss is a 2-digit second (e.g., 30). The Z indicates that the time is expressed in UTC (coordinated universal time).

The logs may also include a severity/importance level and among the kinds of information that can be logged are:
a. User Id: as authenticated with AD/ldap, or other authentication system;
b. Hostname/Client system identity (e.g., by IP address);
c. User role as defined in the AD/ldap or external source;
d. Client type: e.g., VIC, VNC, Web, CIM, SSH, PowerShell, etc.; and
e. Access Protocol: e.g., SOAP/CIM over http/s, SSH, VNC, etc.

Component specific log data may include:
a. The operation the component is performing;
b. Status of the attempted operation: e.g., Success, Fail, Error; and
c. Log Message/Text—error or informational and such.

Log4j is a popular logging framework for Java applications and is suitable for use with the present security appliance. Briefly, within the logging/auditing module 60 a Logger is responsible for capturing the message to be logged, along with certain meta-data such as severity level, and passing that information to the logging framework. After receiving the message, the logging framework calls a Formatter, which accepts an object and formats it for proper logging. The logging framework then hands the formatted message to an appropriate Appender for disposition of the message. This might include displaying the message on a console, writing it to disk, appending it to a database, or sending a notification via email or other channel.

The monitoring and notification module 58 is configured to notify administrators of alarm conditions, such as attempted unauthorized access of virtualized resources. Such notifications may be made by any convenient channel, according to notification policies set by the administrators. Such channels may be arranged in a hierarchy according to immediacy of notification and severity of the alarm condition.

Thus, methods and systems for managing virtualization platforms have been described. It should be apparent to the reader that various embodiments of the present invention may be implemented with the aid of computer-implemented processes or methods (a.k.a. programs or routines) that may be rendered in any computer language and in any series of logical steps performed in a sequence to accomplish the stated purpose. Those portions of the above description that were presented in terms of algorithms and symbolic representations of operations on data within a computer memory were so presented because these are the means used by those skilled in the computer science arts to most effectively convey the substance of their work to others skilled in the art. Such algorithms are, generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a virtualized environment as discussed above. Computer programs which instantiate embodiments of the invention may be stored in or on a tangible computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The processes presented herein are not inherently related to any particular computer or other apparatus. Various systems may be used with the subject processes in accordance with the teachings herein, or it may prove convenient to construct more specialized apparatus to perform the required methods. Among the features to be so provided in accordance with the above teachings are:
  a. Authentication and authorization at a central management layer logically disposed between a plurality of virtualization platforms and management clients therefor, which management layer proxies commands between the management clients and the virtualization platforms. This management layer enforces centralized authentication of virtual infrastructure access and control requests, and authorizes access requests and commands based on the target resource and assigned role-based permissions.
  b. A central audit log collection manager that collects access session information, and aggregates user-accountable log information for all activity occurring on individual virtualization platforms.
  c. Management protocol inspection to validate requested operations based on specific protocols architecture, schema and permitted API calls.
  d. A configuration manager that assesses and remediates virtualization platform configurations based on security best practices, or customized template-based policies to enforce organization-specific deployment security practices.

In VMware implementations, ESX server configuration automation and monitoring is integrated within a VI client user interface, thus affording administrators a single point of access for monitoring, configuration, and management of all virtual infrastructure operations within a data center. Each of the VI clients may be configured to use control layer as a proxy. For networks that do separate out virtual infrastructure control traffic, an alternative deployment option is to configure the control layer as a transparent network bridge in the virtual infrastructure environment, thus reducing its network visibility while still enhancing security. Both deployment approaches mandate that the network access control configuration of each ESX server prevents LAN traffic from sources other than the control layer. Thus, the control layer is able to ensure complete control over the execution of all commands, regardless of the protocol being used, returning the reins of virtual infrastructure control back to the system administrator.

APPENDIX A

SSH_DAEMON_ASSESSMENT_SCRIPT

```
# This script performs an assessment of the target system configuration
# settings of the SSH Daemon.
use File::Basename;
use File::Copy;
use Getopt::Long;
use htUtil;
$testname = basename($0, "");

# CIS 3.6 sshd config

ht_print("CIS 3.6 sshd config to verify SSHD configuration is secure\n");
$vul_found = 0;
$fixme = 0;
$undo_fix = 0;

# CIS recommended secure configuration

%opt = (
    "Protocol" => "2",
    "X11Forwarding" => "yes",
    "IgnoreRhosts" => "yes",
    "RhostsAuthentication" => "no",
    "RhostsRSAAuthentication" => "no",
    "HostBasedAuthentication" => "no",
    "PermitRootLogin" => "no",
    "PermitEmptyPasswords" => "no",
    "Banner" => "/etc/issue.net"
);

# Assess existing SSHD configuration against best practice

sub assess_sshd_config {
    my $fname = $_[0];
    my $opt = $_[1];
    my ($oname, $oval);
    my %flags = ( );
    my $num_lines = 0;
    my %rc = ( );
    if (not -e $fname) {
        ht_report("$testname: file $fname doesn't exist\n");
        ht_abort($testname);
        exit 1;
    }
    open(INPUT, $fname) || do {
        ht_report("$testname: can not open $fname : $!\n");
        ht_abort($testname);
        exit 1;
    };
    #
    # Parse config file, check if options against best practices template
    #
    L1:while (<INPUT>) {
        $num_lines ++;
        chomp;
```

APPENDIX A-continued

SSH_DAEMON_ASSESSMENT_SCRIPT

```
      next L1 if/^#/;
      next L1 if ($_ eq ");
      ($oname, $oval) = split " ";
      if ($opt->{$oname}) {
        $flags{$oname} = $oval;
        if ($opt->{$oname} ne $oval) {
          if ($oname ne "Banner") {
            $rc{$oname} = $num_lines;
          }
          $vul_found++;
          $flags{$oname} = 'incorrect';
          ht_report("$testname: option [$oname] set [$oval]\n");
        }
      }
    }
    #
    # report not set options
    #
    foreach $i (keys %opt) {
      if (! $flags{$i}) {
        if ($i ne "Banner") {
          $rc{$i} = 0;
        }
        $vul_found++;
        ht_report("$testname: option [$i] is not set\n");
      }
    }
    close(INPUT);
    return %rc;
  }
  #
  # Modify configuration based on best practices recommendation
  #
  sub fix_sshd_config {
    my $flags = $_[0];
    my $fname = $_[1];
    my ($key, $line_num, @cgf_file);
    if (not -e $fname) {
      ht_report("$testname: file $fname doesn't exist\n");
      ht_abort($testname);
      exit 1;
    }
    ht_backup( $fname );
    open (FH, ">> $fname");
    foreach $key (keys %$flags) {
      if ($flags->{$key} == 0) {
        print FH "$key $opt{$key}\n";
      }
    }
    close (FH);
    open (FH, "+<", $fname);
    @cfg_file = <FH>;
    foreach $key (keys %$flags) {
      $line_num = $flags->{$key};
      print "$key $line_num\n";
      if ($line_num > 0) {
        print "$key $opt{$key}\n";
        $cfg_file[$line_num - 1] = "$key $opt{$key}\n";
      }
    }
    seek (FH, 0, 0);
    print FH @cfg_file;
    truncate (FH, tell(FH));
    close (FH);
  }
  #
  # Assess and fix each configuration setting
  #
  sub assess_and_fix {
    my ($key, %flags);
    %flags = &assess_sshd_config ($_[0], $_[1]);
    if ($fixme) {
      fix_sshd_config (\%flags, $_[0]);
    }
  }
  #
  # Undo the modifications made to the configuration
  #
  sub revert_fix {
    my $fname = $_[0];
    my $oldf = "$fname.preCIS";
    if (-e $fname && -e $oldf) {
      copy ($oldf, $fname);
      unlink $oldf;
    }
  }
  #
  # main
  #
  GetOptions ('f|fix' => \$fixme,
              'r|revert' => \$undo_fix);
  $fname = "/etc/ssh/sshd_config";
  if ($undo_fix) {
    &revert_fix ($fname);
  } else {
    &assess_and_fix ($fname, \%opt);
  }
  ht_result ($vul_found, $testname);
```

What is claimed is:

1. A system, comprising:

a plurality of virtualization platforms, and one or more administration clients for said plurality of virtualization platforms, each of the plurality of virtualization platforms and the one or more administration clients being communicatively coupled to one another via a control layer logically disposed therebetween, said control layer configured to transparently control execution of virtualization administration commands from the one or more administration clients to said plurality of virtualization platforms, but only after successful authentication of system administrators issuing said virtualization administration commands and privileges of those system administrators, as defined by access control information accessible to said control layer, wherein each of the one or more administration clients is a client through which virtualization administration commands are issued to the plurality of virtualization platforms, the virtualization platforms comprise computer-based resources configured to abstract resources of a computer system or network from one or more operating systems and/or applications executing thereon or therein, and the control layer is configured to inspect and log each attempted access, including failed attempts, to perform administration operations by the one or more administration clients to determine whether or not an asserted administration command or operation is one that is valid and authorized for a respective one of the system administrators issuing the asserted command.

2. The system of claim 1, wherein one or more of the system administrators comprise automated processes or agents.

3. The system of claim 1, wherein the control layer is instantiated as software application running on a physical appliance logically disposed between the plurality of virtualization platforms and the one or more administration clients.

4. The system of claim 1, wherein the control layer is instantiated as a software application, packaged to run on dedicated hardware logically disposed between the plurality of virtualization platforms and the one or more administration clients.

5. The system of claim 1, wherein the control layer is instantiated as a software application, encapsulated as a virtual machine to run on a compatible virtualization platform.

6. The system of claim 1, wherein the control layer operates at an application layer to scrutinize administration access and operation attempts made via the one or more administration clients.

7. The system of claim 1, wherein the control layer is further configured to drop the asserted command if it is either invalid, unauthorized, or both.

8. The system of claim 7, wherein the control layer is further configured to notify a designated contact of a failed attempt to access one or more of the plurality of virtualization platforms.

9. The system of claim 1, wherein authentication mechanisms for the system administrators comprise some or all of: user name/passwords, two-factor authentications, authentications involving digital certificates, authentications involving presentment of a biometric indicator, and a hardware trusted platform module.

10. The system of claim 1, wherein the access control information comprises restrictions based on some or all of: time of day, target virtualization platform, target virtualized resource, attempted management operation or command, and location of administration client.

11. The system of claim 1, wherein upon successful authentication of a subject one of the system administrators, the control layer is configured to enable one or more log-in sessions with one or more of the plurality of virtualization platforms on behalf of the subject system administrator.

12. The system of claim 11, wherein the control layer is further configured to log-in the subject system administrator with the one or more of the plurality of virtualization platforms at an appropriate level of each of the one or more plurality of virtualization platforms.

13. The system of claim 12, wherein the appropriate level comprises a root level.

14. The system of claim 1, wherein the control layer is configured to provide desired platform configurations to one or more of the plurality of virtualization platforms from a single instance of a configuration file or template.

15. The system of claim 1, wherein the control layer is further configured to monitor configuration decisions and activities of the plurality of virtualization platforms.

16. The system of claim 15, wherein, in an event of an alarm condition, the control layer is further configured to alert a designated contact.

17. The system of claim 1, wherein logs of the attempted accesses are stored by an appliance at which the control layer is instantiated prior to being transferred to a remote system.

18. A method of securely managing one or more virtualization platforms, comprising at a control layer disposed between the one or more virtualization platforms and one or more administration clients for said one or more virtualization platforms, said virtualization platforms comprising computer-based resources configured to abstract resources of a computer system or network from one or more operating systems and/or applications executing thereon or therein and said control layer configured to transparently control execution of virtualization administration commands from the one or more administration clients to said one or more virtualization platforms, authenticating system administrators issuing said virtualization administration commands and privileges of those system administrators as defined by access control information accessible to said control layer before permitting administration access to said one or more virtualization platforms, and inspecting and logging each attempted access, including failed attempts, to perform administration operations by the one or more administration clients to determine whether or not an asserted administration command is one that is valid and authorized for a respective one of the system administrators issuing the asserted command, wherein each of the one or more administration clients is a client through which virtualization administration commands are issued to the one or more virtualization platforms.

19. The method of claim 18, wherein one or more of the system administrators comprise automated processes or agents.

20. The method of claim 18, wherein the control layer operates at an application layer to scrutinize administration access and operation attempts made via the one or more administration clients.

21. The method of claim 18, wherein the control layer drops the asserted command if it is either invalid, unauthorized, or both.

22. The method of claim 21, wherein the control layer notifies a designated contact of a failed attempt to access the one or more virtualization platforms.

23. The method of claim 18, wherein the control layer authenticates the system administrators using one or more of the following authentication mechanisms: user name/passwords, two-factor authentications, authentications involving digital certificates, authentications involving presentment of a biometric indicator, and authentications involving a hardware trusted platform module.

24. The method of claim 18, wherein the access control information comprises restrictions based on some or all of: time of day, target virtualization platform, target virtualized resource, attempted administration operation or command, and location of administration client.

25. The method of claim 18, wherein upon successful authentication of a subject one of the system administrators, the control layer enables one or more log-in sessions with the one or more virtualization platforms on behalf of the subject system administrator.

26. The method of claim 25, wherein the control layer logs-in the subject system administrator with the one or more virtualization platforms at an appropriate level of each of the one or more virtualization platforms.

27. The method of claim 26, wherein the appropriate level comprises a root level.

28. The method of claim 18, wherein the control layer provides desired platform configurations to the one or more virtualization platforms from a single instance of a configuration file or template.

29. The method of claim 21, wherein the control layer monitors configuration decisions and activities of the one or more virtualization platforms.

30. The method of claim 29, wherein, in an event of an alarm condition, the control layer alerts a designated contact.

31. The method of claim 21, further comprising storing logs of the attempted accesses at an appliance at which the control layer is instantiated prior to transferring the logs to a remote system.

* * * * *